United States Patent [19]
Crowley et al.

[11] Patent Number: 5,103,338
[45] Date of Patent: Apr. 7, 1992

[54] APPARATUS FOR POSITIONING OBJECTS FOR MICROSCOPIC EXAMINATION

[76] Inventors: Kevin D. Crowley, 9 Carrie Cir., Oxford, Ohio 45056; Joel H. Young, 7510 E. Lindsey, Norman, Okla. 73071

[21] Appl. No.: 592,845

[22] Filed: Oct. 4, 1990

[51] Int. Cl.$^5$ .............................................. G02B 21/26
[52] U.S. Cl. ............................................... 359/394
[58] Field of Search .............. 350/532, 531, 530, 528, 350/321, 507

[56] References Cited

U.S. PATENT DOCUMENTS

| | | | |
|---|---|---|---|
| 235,030 | 11/1880 | Sidle | 350/532 |
| 2,265,182 | 12/1941 | Mestre | 350/532 |
| 2,530,352 | 11/1950 | Gallasch | 350/528 |
| 2,960,913 | 11/1960 | Herrala | 350/532 |
| 3,549,232 | 12/1970 | Hugle | 350/90 |
| 3,762,798 | 10/1973 | Grubb et al. | 350/86 |
| 4,477,157 | 10/1984 | Gaul | 350/532 |
| 4,503,555 | 3/1985 | Brimhall et al. | 382/61 |
| 4,513,438 | 4/1985 | Graham et al. | 382/6 |
| 4,582,191 | 4/1986 | Weigand | 198/339.1 |
| 4,589,741 | 5/1986 | Clegg | 350/532 |
| 4,609,264 | 9/1986 | Podvin et al. | 350/529 |
| 4,627,009 | 12/1986 | Holmes et al. | 364/559 |
| 4,818,169 | 4/1989 | Schram et al. | 350/531 |
| 4,824,229 | 4/1989 | Narita et al. | 350/531 |
| 4,845,552 | 7/1989 | Jaggi et al. | 358/93 |
| 4,936,655 | 6/1990 | Leib et al. | 350/245 |

FOREIGN PATENT DOCUMENTS 2623299 5/1989 France .................. 350/507

*Primary Examiner*—Jon W. Henry

[57] ABSTRACT

Apparatus for positioning objects for microscopic examination includes a stage module which may be attached to standard microscope, and a control module. The stage module is comprised of a translating stage, a rotating stage, and a pair of rotating sample holders. The translating stage is movable horizontally in a linear direction, and the rotating stage is carried on the translating stage for rotational movement about a vertical axis. The rotating sample holders may be rotated about their centers, and they are linked together so that their rotational movements are equal in magnitude but opposite in direction. The respective movements of the translating stage, the rotating stage and the rotating sample holders are controlled by the control module. A method for microscopic examination of objects includes the step of moving the translating stage and rotating the sample holders to bring an original point on an object that is placed in one of the sample holders to a focal point of an objective lens of the microscope. The method further includes the step of rotatably moving the rotating stage 180 degrees about its axis of rotation to bring a complementary point on an object that is placed in the other sample holder to the focal point of the objective lens.

12 Claims, 10 Drawing Sheets

APPARATUS FOR POSITIONING OBJECTS FOR MICROSCOPIC EXAMINATION

BACKGROUND OF THE INVENTION

This invention relates generally to a method and apparatus for positioning objects for microscopic examination and, more particularly, to apparatus that attaches to a standard microscope to enable parcentric positioning of objects.

A standard microscope includes a light source, an objective lens and viewing arrangements (e.g. eyepiece or camera/CRT) for examination or manipulation of objects at high magnifications. Standard microscopes include commercially available petrographic, metallographic and semiconductor microscopes.

Parcentric positioning is the positioning of complementary points on two different objects at the focal point of the objective lens on a microscope. Complementary points refer to any pair of points on two objects that are related by a mirror plane. Such points would be in contact if the two objects were placed in a face-to-face orientation.

The need for parcentric positioning arises in several fields of scientific research, one of which is a scientific technique known as fission-track dating. This technique, which is used too determine the time of cooling of rocks in the earth's crust, involves the analysis of microscopic damage zones in certain uraniferous minerals that are produced by the spontaneous fission of U-238.

In order to determine a fission-track age, an aliquot of a uranium-bearing mineral is mounted in a small (less than 1" diameter) epoxy wafer, which is subsequently ground to expose the mineral grains and then polished. The polished surfaces of the mineral grains are then etched to reveal (i.e. enlarge) the naturally produced U-238 fission-tracks that have accumulated over geologic time. These etched tracks are needlelike features about 1-2 microns in diameter and about 15 microns in length. The polished and etched grain mounts are covered with thin sheets of uranium mica and placed in a tube that is irradiated with thermal neutrons in a nuclear reactor. Irradiation induces fission of U-235 in the mineral grains in direct proportion to its concentration and the neutron fluence. This fissioning of U-235 produces a second set of tracks termed induced racks, which pass into the mica sheets wherever they are in contact with the polished surfaces of the mineral grains. Following irradiation, the mica sheets are separated from the grain mounts and etched to reveal these induced tracks.

In order to calculate the fission-track age, it is necessary to measure track densities of the surfaces of the mineral grains as well a mica helps in contact with the mineral grains. This is accomplished by counting tracks contained within a grid reticle in the path of the microscope, typically at magnifications between 1000× and 2000×. The reticle is first superimposed on a mineral grain selected at random in the mount, the number of tracks contained within the grid is determined by visual counting. Next, the reticle is placed over the complementary area (comprising a set of complementary points) on the mica sheet that was in contact with the mineral grain during irradiation, and tracks within the grid are again counted. The process is repeated for several grains, until sufficient tracks are counted for a reliable age to be determined.

The placement of grain mounts and mica sheets in face-to-face orientations during irradiation produces counting areas that are mirror images, that is, counting areas that consist of complementary points. Thus, the problem of locating counting areas at high power reduces to the more general problem of parcentric positioning of a point on the grain mount with its complement on the mica sheet. In fission-track dating, parcentric position is a significant problem. In particular, complementary points on the mica sheet are extremely difficult to identify, because (1) there is no grain outline on the mica sheet, only a concentration of induced tracks where the sheet was in contact with the mineral grain during irradiation, and (2) the geometry of the counting area on the mica sheet is reversed (i.e. a mirror image) with respect to the counting area on the mineral grain because they were oriented face-to-face during irradiation. Precise positioning of the counting grid on the mica sheet is both tedious and time consuming, and positioning uncertainties may be a significant source of error in the age determination.

Two types of apparatus are presently used to achieve parcentric positioning for fission-track dating. One type of apparatus is a mechanical stage that attaches directly to the viewing platform of a microscope with one or more mounting screws, and which is capable of movement in two horizontal, orthogonal directions using hand-operated knobs. Parcentric positioning is done manually using mental pattern recognition. The positioning process is quite tedious and, in fact, precise positioning can be done only when the mica sheet contains high a real densities of tracks.

The other type of apparatus is a mechanical stage that attaches to a microscope in place of the standard viewing platform, and in which movement in two horizontal, orthogonal directions is controlled by two stepper motors and a joystick. Some versions of this type of apparatus incorporates a third stepper motor to control the vertical position of the mechanical stage for focusing. Parcentric positioning is done in software. However, this requires the initial alignment of each grain mount and mica sheet, which are usually cemented side-by-side on a glass microscope slide, on the mechanical stage by manually locating and entering the coordinates of several sets of complementary points into an algorithm. Although the algorithm speeds up the counting process considerably, the quality of the alignment depends entirely on the ability of the analyst too accurately locate complementary points on the grain mounts and mica sheets. Like the manual type of apparatus described above, precise alignment is possible only when the mica sheet contains high areal densities of tracks.

SUMMARY OF THE INVENTION

An object of the present invention is to provide a method and apparatus for parcentric positioning for use in fission-track dating.

The method for parcentric positioning utilizes certain geometric properties f complementary points that allow parcentric positioning too be implemented through mechanical means, that is, without software alignment algorithms. This method is implemented using apparatus that mounts on a standard microscope in place of the viewing platform. The advantages of this method are the speed, ease, accuracy and reproducibility with which parcentric positioning can be obtained. At the same time, the apparatus is no more costly to manufacture than other automatic apparatus, yet it is compact, rugged and easy to maintain and operate.

The apparatus comprises a stage module, which attaches to a standard microscope in place of the conventional viewing platform, and a control module. The stage module comprises three integrated components including a translating stage, a rotating stage and rotating sample holders. These components are attached too a fixed base plate that mounts to a setting stage, which in turn mounts on the focusing dovetail on a standard microscope. The translating stage, which is mounted on the base plate, allows horizontal, linear movement of the attached rotating stage and rotating sample holders. The rotating stage, which is mounted on the translating stage, rotates through an angle of 180 degrees about a vertical axis that is oriented perpendicular to the plane of the translating stage. The rotating sample holders, which are mounted within the rotating stage, can be rotated infinitely about their centers. These sample holders are mechanically linked and their axes of rotation are equidistant from and coplanar with the vertical axis of rotation of the rotating stage.

Scanning of the gain mount and parcentric position of the mica mount are accomplished with stepper-motor and/or keyboard/software controlled translations or rotations of the above-described three components. The grain mount is scanned to bring the desired counting area to the focal point of the objective lens of the microscope by joystick-controlled movements of the translating stage and rotating sample holders. The complementary point on the mica mount is then brought to the focal point of the objective lens by a keyboard or software-initiated 180 degree rotation of the rotating stage. Parcentric positioning can be obtained by this single rotation of the rotating stage because of the geometrical arrangement of the centers of rotation of the rotating stage and rotating sample holders, as well as the geometrical arrangement of the grain and mica mounts on the rotating sample holders.

DESCRIPTION OF THE PREFERRED EMBODIMENT

Figure 1:
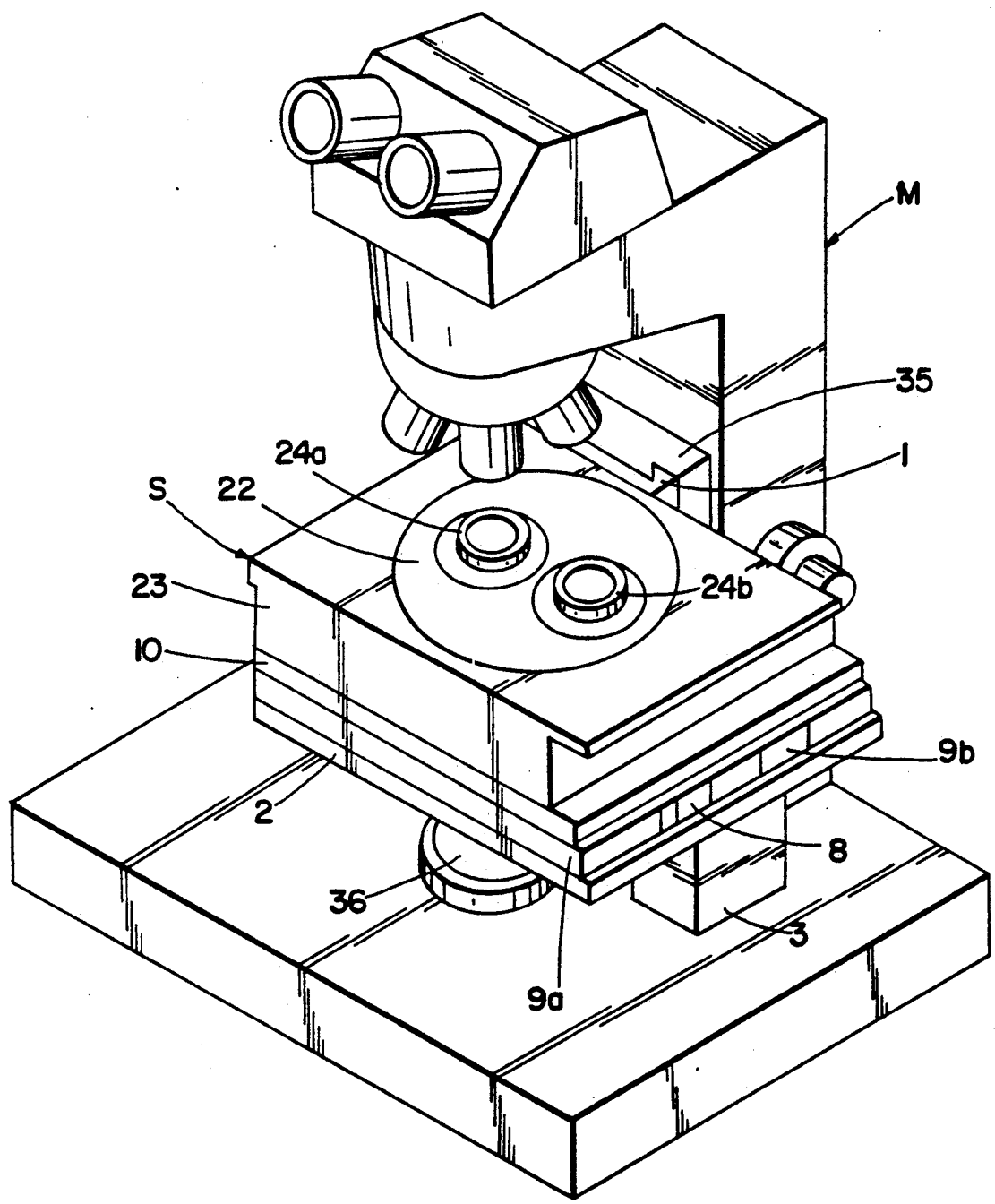
FIG. 1 is a perspective view of a standard microscope with a stage module according to the present invention attached thereto.
Figure 3:
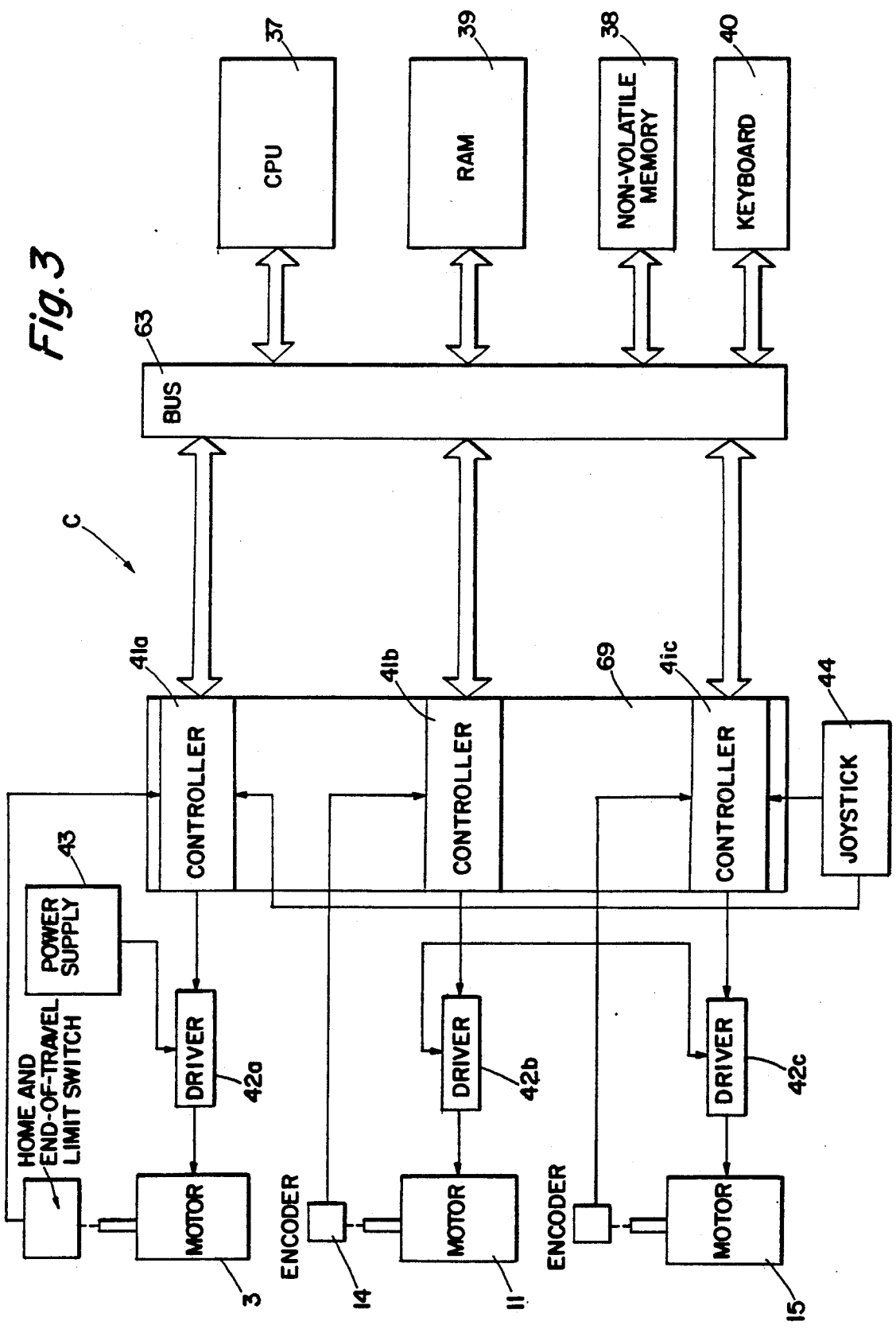
FIG. 3 is a block diagram of a control module according to the present invention.

Apparatus according to the present invention consists of a stage module S shown in FIG. 1 and a control module C shown in FIG. 3. The stage module S attaches directly to a standard microscope M in place of the conventional viewing platform. The control module C is wired to the stage module S through a single cable with a pin connector and controls stepper motors, optical encoders, homing switches and travel-limit switches on the stage module S as described below.

Figure 2:
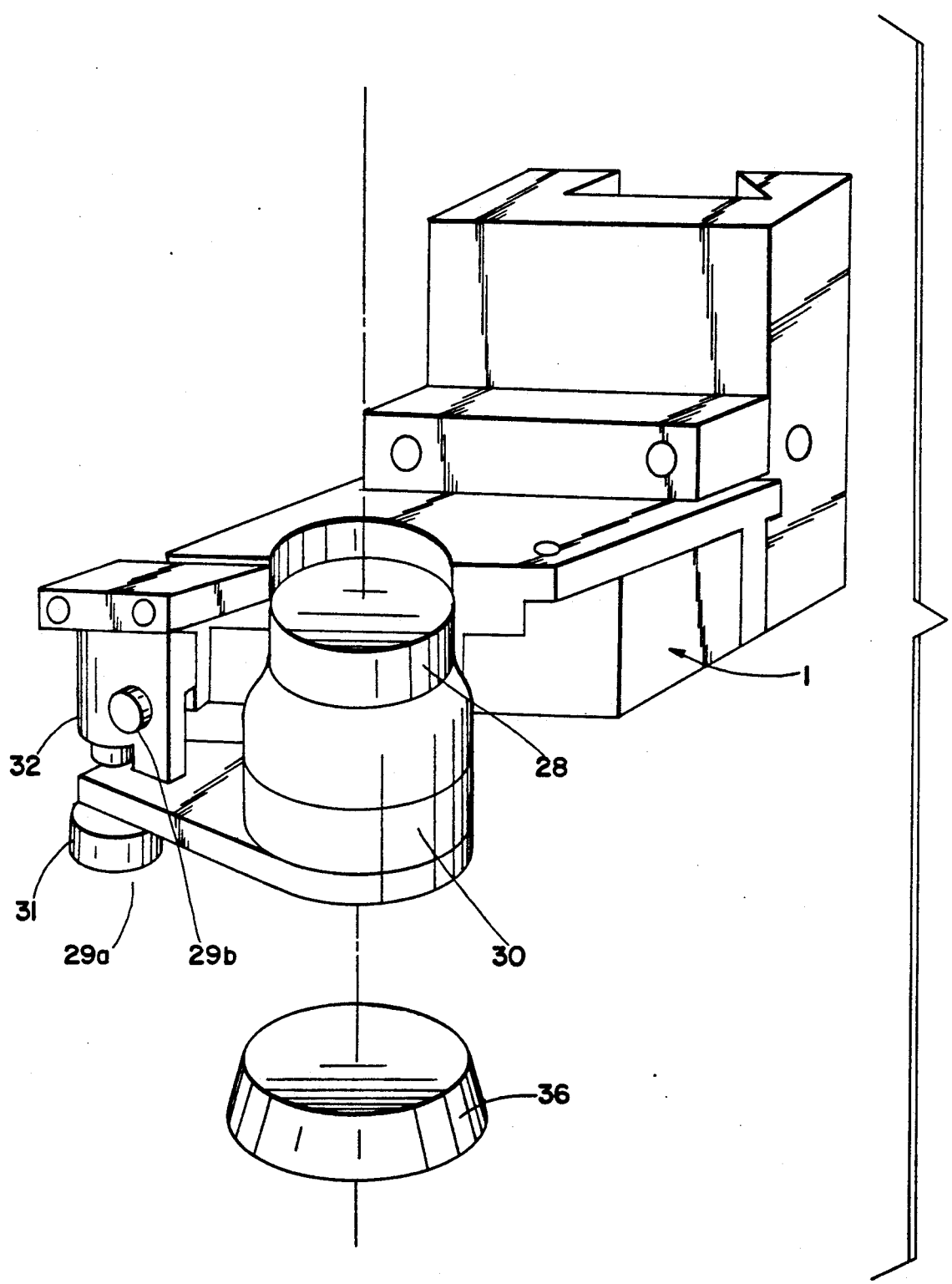
FIG. 2 is a perspective view of a condenser assembly on the stage module.

The stage module S is comprised of a setting stage 1, a base plate 2, a translating stage 10, a rotating stage enclosure 23, a rotating stage 22 and a pair of rotating sample holders 224a and 24b, which are shown in FIG. 1, as well as an optical condenser 28, which is shown in FIG. 2. The setting stage 1 attaches directly to the focusing dovetail 35 on a standard microscope M. It has a manually operated worm drive 33a with coarse and fine adjustments 33c, 33b (FIG. 6) to align the stage module S with respect to an objective lens 34 during initial installation as explained later.

The optical condenser 28 is of a conventional type and attaches to the setting stage 1 as shown in FIG. 2. It focuses the light emitted from a light source 36 on the microscope base B through an opening in the base plate 2 onto the sample for improved image resolution. This condenser 28 has the usual centering knobs 29a, 29b, focusing knob 31 and diaphragm 30, as well as a hinge 32 that allows it to be removed from the light path of the microscope M.

Figure 4:
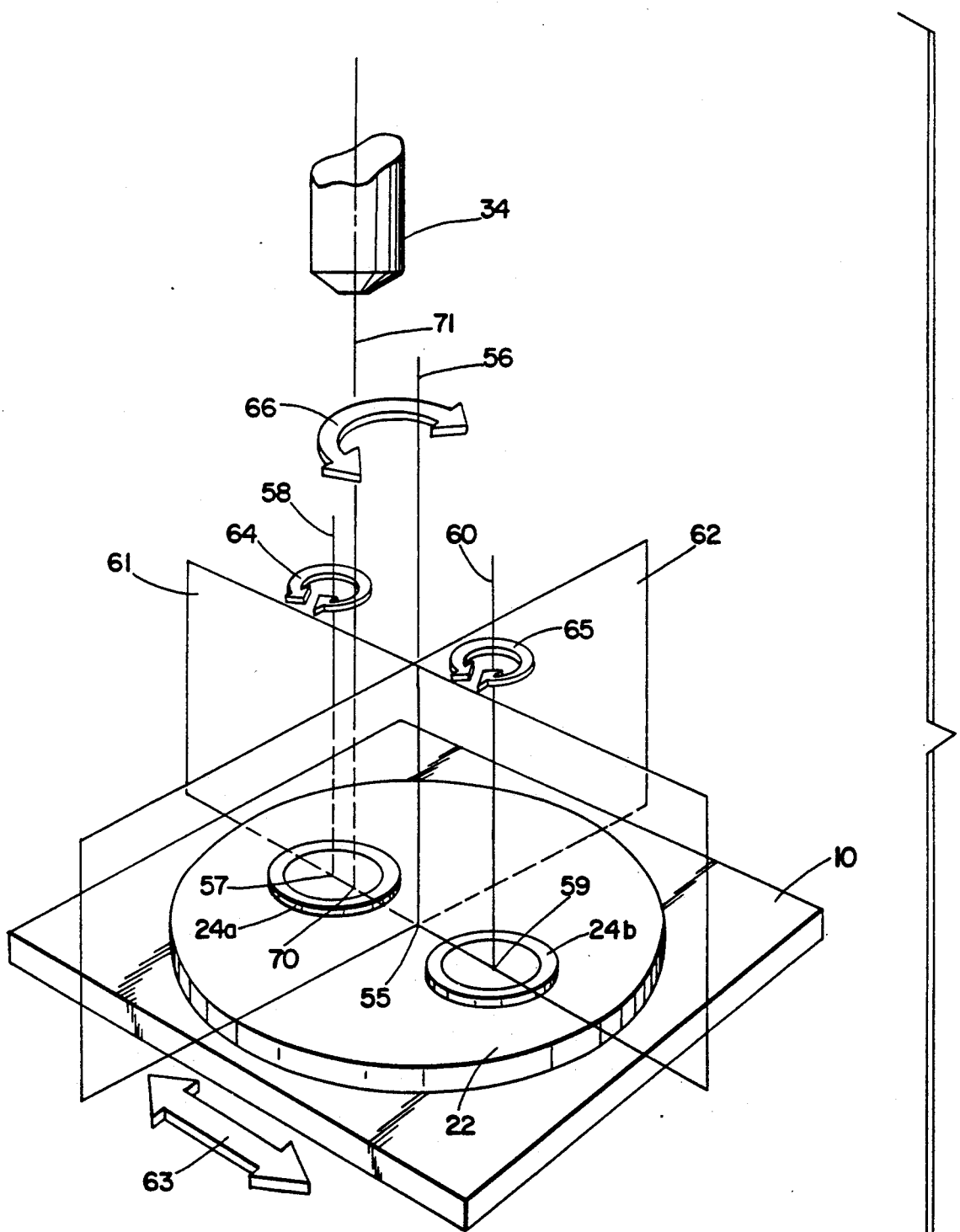
FIG. 4 is a simplified, perspective view of the stage module showing the directions of movement of a translating stage, a rotating stage and a pair of rotating sample holders, the orientations of the centers of rotation and axes of rotation of the rotating stage and rotating sample holders, and the focal axis and focal point of an objective lens.
Figure 5:
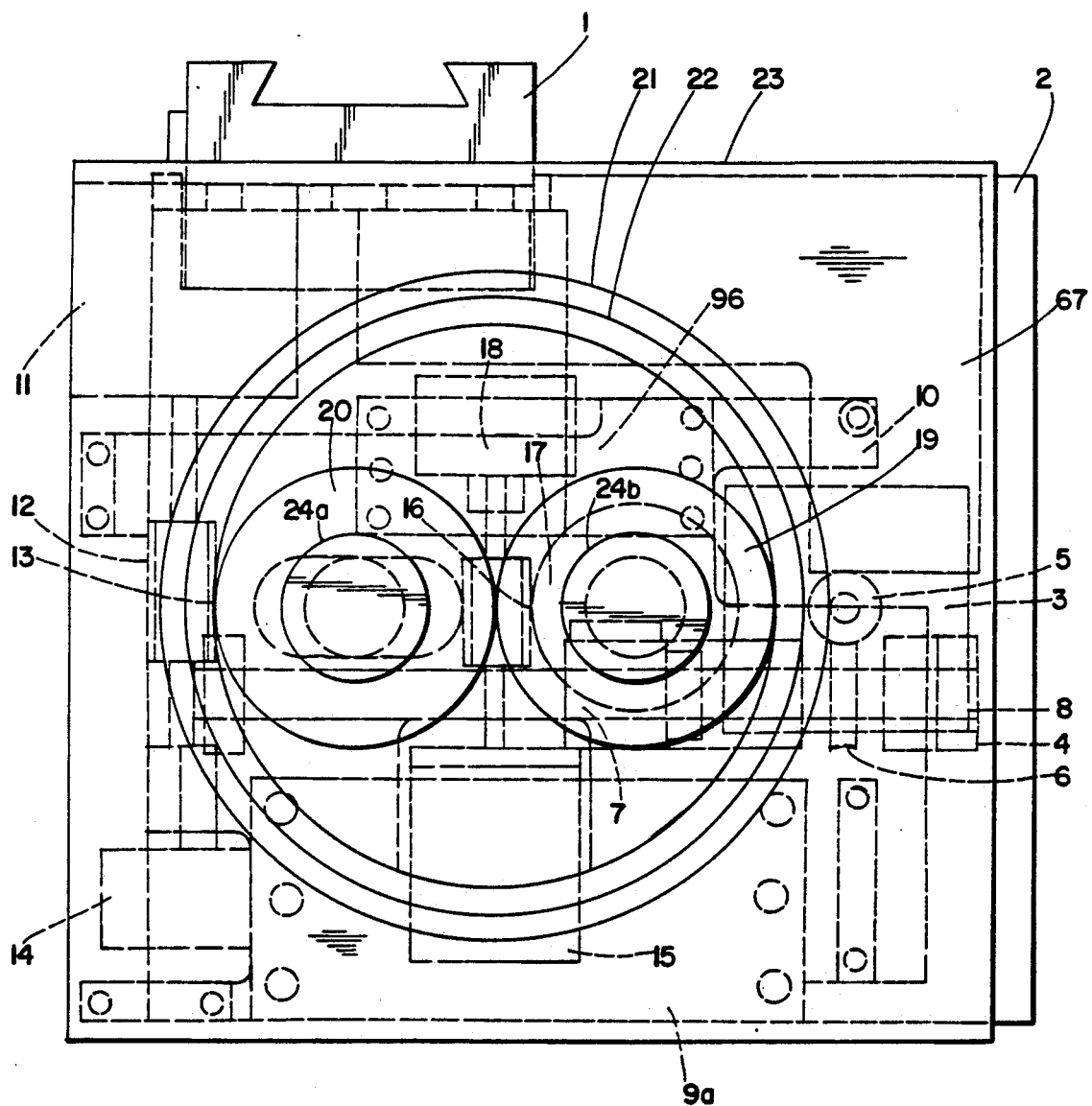
FIG. 5 is a top sectional view of the stage module.
Figure 6:
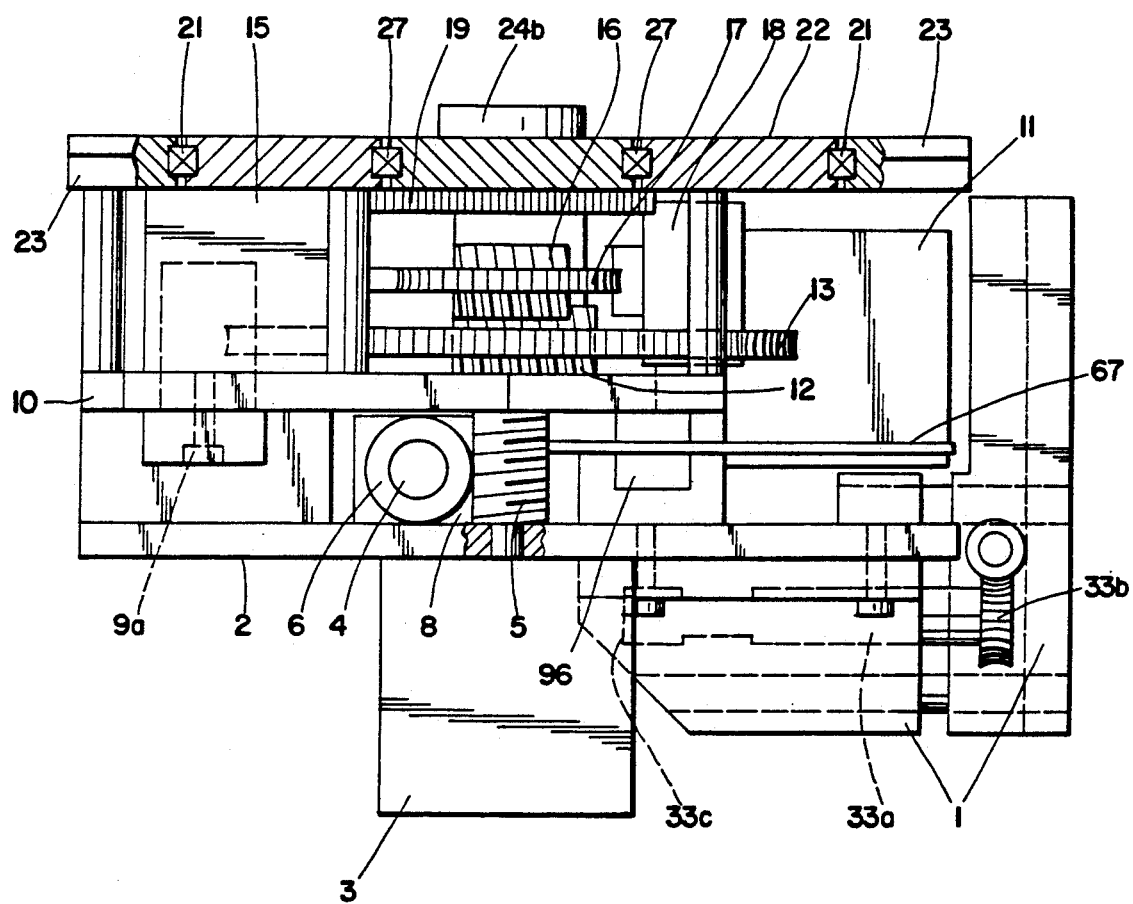
FIG. 6 is a side elevation sectional view of the stage module.

The base plate 2, which is attached to the setting stage 1, carries a translating stage 10 mounted on ball slides 9a, 9b as best shown in FIG. 5 and FIG. 6. The translating stage 10 is driven with a stepper motor 3 of a conventional type. An anti-backlash ball screw 4, end bearing 8, zero backlash nut 7, worm gear 6 and worm 5 provide a smooth transfer of rotational motion of the stepper motor 3 to east-west translational motion 63 (FIG. 4) of translating stage 10. In the preferred embodiment, submicron movements of the translating stage 10 are obtained by microstepping the motor 3. Limiting switches (not shown) at each end of the range prevent over travel, and an infrared homing switch (not shown) establishes an absolute zero point from which all positions can be referenced by counting motor steps.

Figure 7:
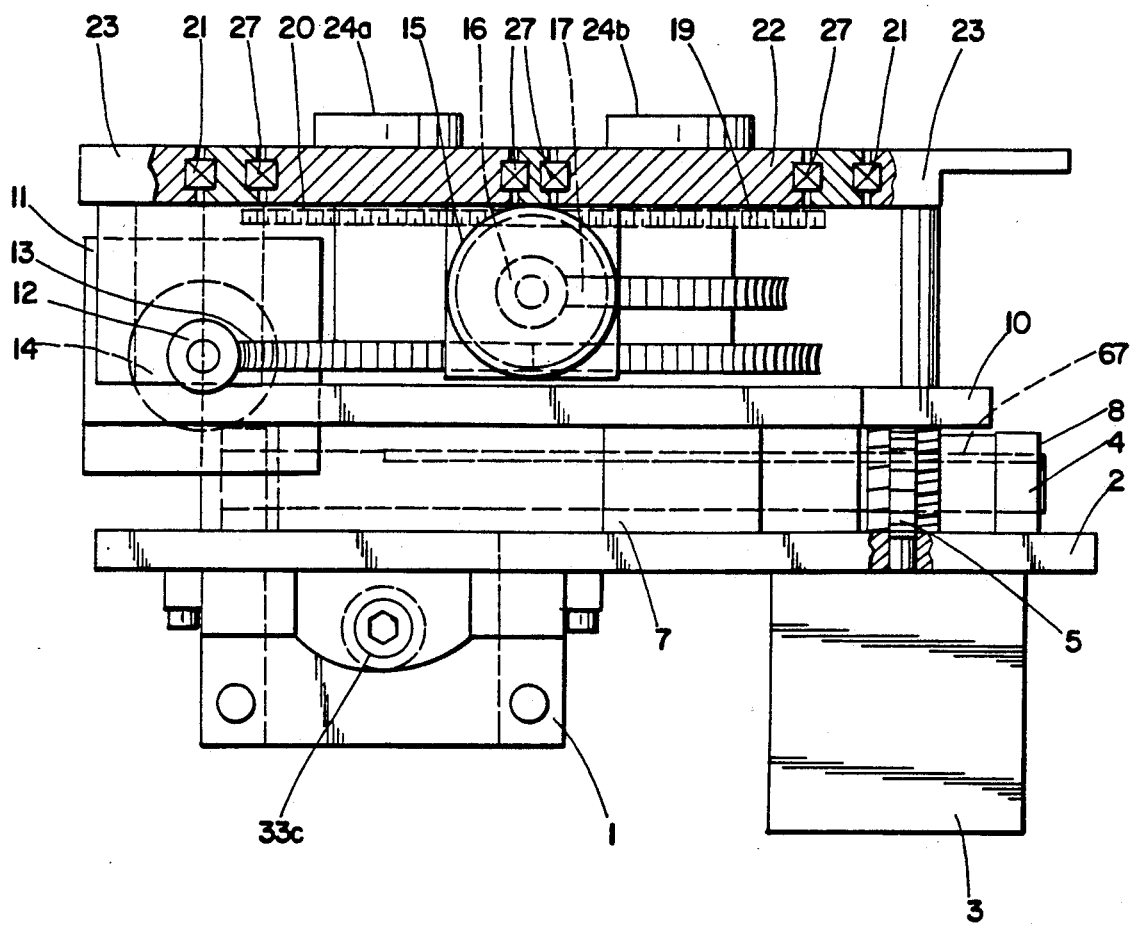
FIG. 7 is a front elevation sectional view of the stage module.

The rotating stage enclosure 23 is attached to the translating stage 10. Rotating stage 22, which rotates about a vertical axis 56 shown in FIG. 4, is attached to this enclosure 23 with a circular bearing 21 as shown in FIG. 6 and FIG. 7. The rotating stage 22 is driven with a stepper motor 11 of a conventional type using a worm 12 and anti-backlash worm gear 13 as shown inn FIG. 5 and FIG. 7. In the preferred embodiment, submicron movements of the rotating stage 22 are obtainment by micro stepping the motor 11. The absolute position of the stage 22 is established using an optical encoder 14.

The rotating sample holders 24a, 24b are mounted within the rotating stage 22 on bearings 27 shown inn FIG. 7. One sample holder 24b is driven with a stepper motor 15 of a conventional type via a worm 16 and anti-backlash worm gear 17. The rotation of the sample holder 24b is transferred to the other sample holder 24a via an anti-backlash fine pitch gear train consisting of a drive pinion 19 and driven pinion 20 as shown in FIG. 7. The mechanical linkage of the two sample holders 24a, 24b produces rotational movements about their centers 57, 59 that are equal in magnitude but opposite in direction as indicated by arrows 64, 65 shown in FIG. 4. This is referred to as lemniscate rotation. The axes of rotation 58, 60 of the sample holders 24a 24b are coplanar with an equidistant from the axis of rotation 56 of the rotating stage 22 as shown in FIG. 4. Submicron movements of the sample holders 24a, 24b are obtained by microstepping the drive motor 15. The absolute position of the ample holders 24a, 24b is established using an optical encoder 18.

Figure 8:
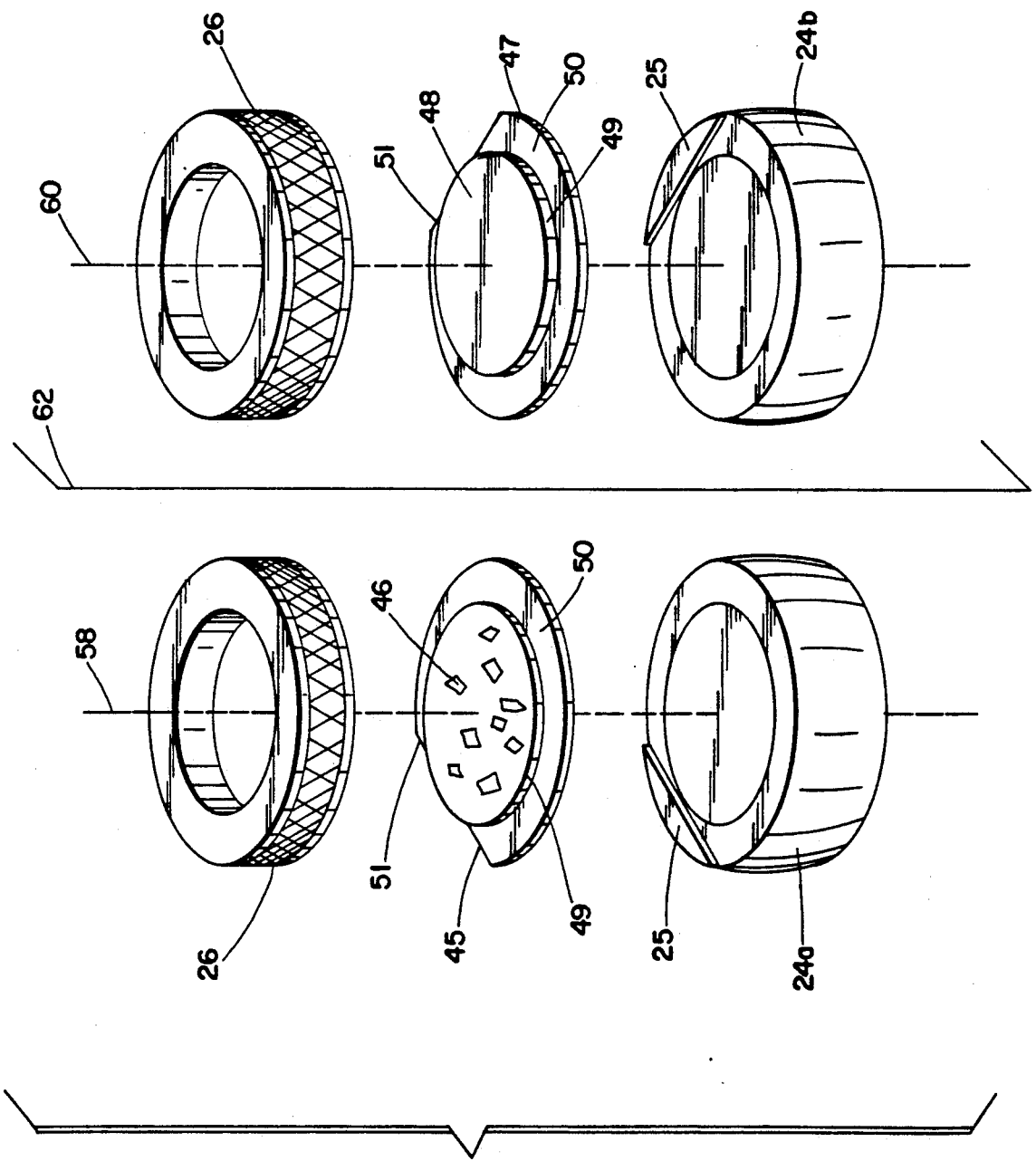
FIG. 8 is an exploded perspective view of the rotating sample holders on the stage module showing the orientation of alignment keys, a grain mount, a mica mount and retaining caps.

The sample holders 24a, 24b contain alignment keys 25 as shown in FIG. 8 that are used to align a grain mount 45 and a mica mount 47 on the stage module S as described below. The alignment keys 25 are mirror images with respect to a north-south, vertical plane 62 that contains the axis of rotation 56 of the rotating stage 22 and that is orthogonal to an east-west vertical plane 61 that contains the axes of rotation 56, 58, 60 of the rotating stage 22 and rotating sample holders 24a, 24b as shown in FIG. 4 and FIG. 8. Retaining caps 26, shown in FIG. 8, fit snugly over the sample holders 24a, 24b to fix the grain mount 45 and mica mount 47 to the stage module S.

The stepper motor 33 that drives the translating stage 10 is mounted to the underside of the base plate 2 as shown in FIG. 1. The other stepper motors 11, 15 and their associated encoders, gears and switches are mounted within the rotating stage enclosure 23. Power and control connections for the drive motors, encoders, home switch and travel-limit switches are made to a printed circuit board 67, shown in FIG. 6 and FIG. 7, that connects to control module C with a pin connector (not shown).

The control module C shown in FIG. 3 consists of stepper-motor controllers 41a, 41b, 41c, stepper-motor drivers 42a, 42b, 42c, a power supply 43 and a two-axis joystick 44. In the preferred embodiment, a commercially available, control board 69 is used to operate the stage module S. The board 69, which plugs into the address bus 68 of a microprocessor 37, contains firmware to control the stepper motors 3, 11, 15 and to poll the optical encoders 14, 18 and the homing switch and limiting switches on the translating stage 10. The board 69 can be controlled with a microprocessor 37 by a combination of commands typed at a keyboard 40, commands from software running in random-access memory (RAM) 39 or with the joystick 44. The control board 69 sends firmware control signals to the drivers 421, 42b, 42c, which supply power to the stepper motors 3, 11, 15 from the power supply 43. The joystick 44 attached to the control board 69 controls the stepper motors 3, 15 that drive the translating stage 10 and the rotating sample holders 24a, 24b. The control board 69 incorporates state-of-the-art microstepping technology that allows submicron movements of the translating stage 10, rotating stage 22 and rotating sample holders 24a, 24b as described previously.

The stage module S is installed on a standard microscope M by sliding the setting stage 1 over the focusing dovetail 35 (FIG. 1) and tightening a set screw (not shown). Several one-time adjustments are then made to align the stage module S with the optical path of the objective lens 34. First, the rotating stage 22 is rotated about its axis 56 using the joystick 44 to bring the vertical plane 61 containing the axes of rotation 56, 58, 60 of the rotating stage 22 and the rotating sample holders 24a, 24b into an east-west orientation (FIG. 4). The optical encoder 14 on the motor 11 controlling the rotating stage 22 is then polled by the control board 69 to determine the absolute position of the stage 22. This position, denoted $p_1$, is stored in non-volatile memory 38 (FIG. 3) for later use.

Second, the center of rotation 57 of rotating sample holder 24a is brought into coincidence with the focal point 70 of the objective lens 34 (FIG. 4) by driving the translating stage 10 with the joystick 44 and by manually adjusting the coarse and fine adjustments 33c, 33b on the worm drive 33a on the setting stage 1. The translating stage 10 produces east-west movement, as indicated by arrow 63, of the center of rotation 57 of the sample holder 24a with respect to the focal point 70 of the objective lens 34. The worm drive 33a on the setting stage 1 produces north-south movement of the base plate 2 and attached components, including the center of rotation 57 of sample holder 24a, with respect to the focal point 70 of the objective lens 34. After coincidence is achieved, the rotating stage 22 is then rotated through an angle of 180 degrees, as indicated by arrow 66, about its axis of rotation 56 using commands from keyboard 40 to bring the center of rotation 59 of the other rotating sample holder 24b to the focal point 70 of the objective lens 34 (FIG. 4). The optical encoder 14 is again polled by the control board 69 to determine the absolute position of the rotating stage 22. This position, denoted $p_2$, is also stored in non-volatile memory 338 for later use.

Once these initial adjustments to the stage module S are completed, parcentric positioning of the grain mount 45 and the mica mount 47 can be obtained mechanically, provided that they are oriented in the sample holders 24a, 24b as mirror images with respect to the vertical plane 62 shown in FIG. 8. The following paragraphs describe how this orientation is achieved on a rapid and routine basis.

Figure 9:
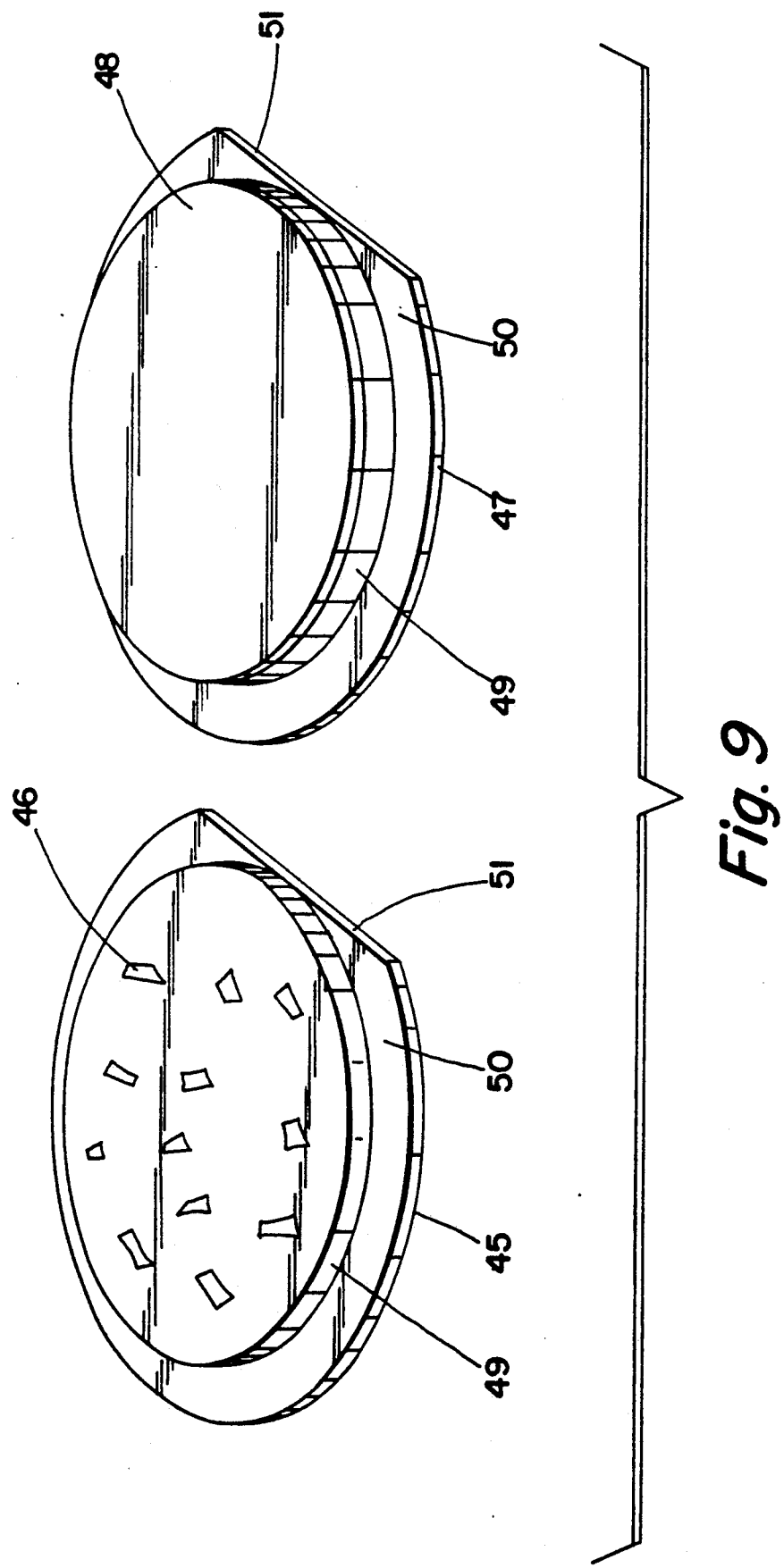
FIG. 9 is an enlarged perspective view of a grain mount and a mica mount.

In the preferred embodiment, grain mounts 45 and mica mounts 47, consisting of mineral grains 46 and mica sheets 48 embedded in epoxy or polyester wafers 49 of identical thickness, are attached to 250-micron (10-mil) thick, transparent mylar slides 50 using commercially available adhesives, as shown in FIG. 9. These slides 50 contain blunt cutoffs 51 used too orient them in an aluminum irradiation tube 52 shown in FIG. 10 and in the rotating sample holders 24a, 24b on the stage module S. The mylar slides 50 are stamped using a conventional punch and die.

Figure 10:
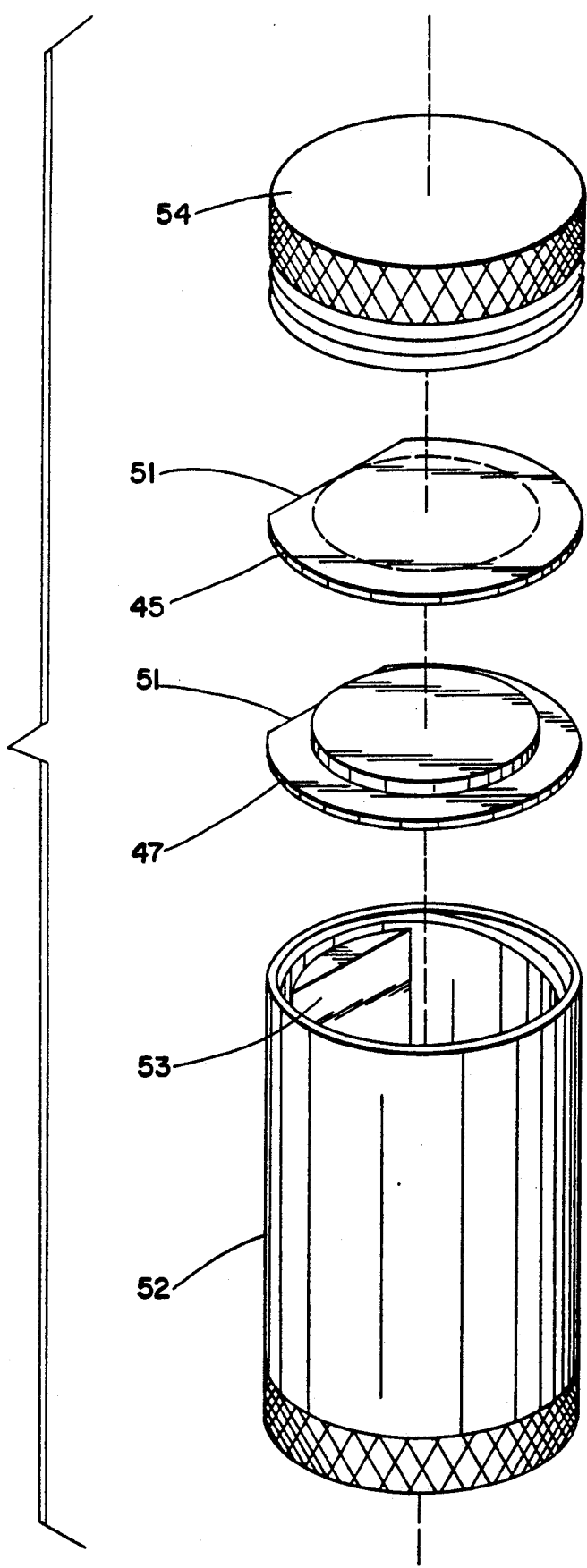
FIG. 10 is an exploded perspective view showing the arrangement of a grain mount and a mica mount in an aluminum irradiation tube.

The grain mounts 45 and mica mounts 47 are irradiated together in the aluminum irradiation tube 52 shown in FIG. 10. This tube 52 contains an alignment shoulder 53 that fits snugly against the blunt cutoffs 51 on the mylar slides 50, thereby fixing the orientations of the attached grain mounts 45 and mica mounts 47. The tube 52 is packed by stacking several pairs of grain mounts 45 and mica mounts 47 in a face-to-face orientation, as shown for one pair in FIG. 10. Tube 52 is closed with a threaded cap 54 that compresses the mica mounts 47 and grain mounts 45 to assure intimate contact during irradiation.

The irradiation of the mounts 45, 47 with thermal neutrons in a reactor produces a set of induced tracks in the mica sheets 48 inn contact with the polished grains 46. After irradiation, the grain mounts 45 and mica mounts 47 are removed from the irradiation tube 52, then the mica mounts 47 are etched to reveal the induced tracks. A grain mount 45 and a mica mount 47 are then placed in the rotating sample holders 24a, 24b for scanning and counting. The blunt cutoffs 51 on the mylar slides 50 fit snugly against the alignment keys 25 on the rotating sample holders 24a, 24b (FIG. 8). The mounts 45, 47 are held snugly in place with the retaining caps 26.

Because the alignment keys 25 on the sample holders 24a, 24b are mirror images with respect to the vertical plane 62, the grain mount 45 and the mica mount 47 are also mirror images with respect to plane 62 when mounted snugly against the alignment keys 25. That is, the alignment keys 25 on the rotating sample holders 24a, 24b maintain the alignment of the grain mount 45 and the mica mount 47 established during irradiation. Parcentric positioning can thus be obtained with a 180 degree rotation of the rotating stage 22 about its axis of rotation 56, as explained in the following paragraphs.

The area on the grain mount 45 to be counted is brought to the focal point 70 of the objective lens 34 (FIG. 4) by joystick-controlled movements of the translating stage 10 and rotating sample holders 24a, 24b. Horizontal movement of the translating stage 10 in a linear direction, as indicated by arrow 633, allows east-west scanning of the grain mount 45 (FIG. 4). Rotational movement of the rotating sample holders 24a, 24b allows circumferential scanning of the grain mount 45 about the center of rotation 57 of the sample holder 24a (FIG. 4).

The lemniscate rotation (indicated by arrows 64, 65) of the sample holders 24a, 24b described previously maintains the mirror image of the grain mount 45 and the mica mount 47 with respect to the vertical plane 62 shown in FIG. 4 and FIG. 8. Therefore, after a point on the grain mount 45 is selected for inspection or analysis, a parcentric point on the mica mount 47 is brought to the focal point 70 of the objective lens 34 by rotating the stage 22 through an angle of 180 degrees in direction of arrow 66 about its axis of rotation 56. Inn the preferred embodiment, this stage 22 is rotated too the optical-encoder established alignment point determined during initial installation of the stage module S as discussed previously. This is accomplished by issuing a command through the keyboard 40 or via software running in RAM 39 to the control board 69 (FIG. 3) to drive the stepper motor 11 to the position $p_2$ stored in nonvolatile memory 38.

The grain mount 45 can be returned to the focal point 70 of the objective lens 34 by issuing another keyboard or software command to the control board 69 to drive the stepper motor 11 to position $p_1$ which is also stored in nonvolatile memory 38. The scanning and counting procedure can then be repeated. Note that because the grain mount 45 and mica mount 47 are the same thickness, they an be rotated to the focal axis 71 without striking the objective lens 34. This eliminates the need to constantly adjust the focusing mechanism during operation.

In the preferred embodiment, a software algorithm running in RAM 39 is used to collect and analyze the counting data. This algorithm automatically issues commands to the control board 69 through the bus 68 to drive the rotating stage 22 between the positions $p_1$ and $p_2$ after the appropriate counting data is collected. Additionally, the algorithm allows the stage 22 to be rotated by pressing certain "hot keys" on the keyboard 40. The algorithm also records the coordinates of the counting areas for later relocation and reanalysis.

The accuracy and repeatability of parcentric positioning obtainable with the present invention depends on several factors, including: (1) the quality of the bearings and gears; (2) the alignment of the rotating sample holders 24a, 24b during fabrication of the stage module S; and (3) the alignment of the stage module S on the microscope M. The preferred embodiment incorporates class 6 bearings and class 12 anti-backlash bears. The rotating sample holders 24a, 24b are aligned to an accuracy of about 0.0005 radians using lasers and mirrors. Alignment of the stage module S on the microscope M can routinely be made to precision better than or equal to 0.5 microns using the worm drive 33 on the setting stage 1. Parcentric positioning can thus be achieved with an accuracy equal to or better than 0.5 microns. With the micro stepping technology incorporated in this apparatus, repeatability is equal to or better than 0.01 microns in constant temperature/low vibration operating environments.

Although this invention has been described in terms of the preferred embodiment, it will be realized that various alterations and permutations thereof may be possible. Similarly, although this invention was designed primarily for fission-track dating, it is anticipated that other applications may e possible, for example, in the semiconductor industry for examination, manipulation or manufacture of integrated chips, circuit boards or photomasks, in high-energy physics for the examination of stacked film detectors, or in medical research for the examination or manipulation of sectioned tissues. It is therefore intended that the following claims be interpreted as including all such alterations, permutations and modifications that fall within the spirit and scope of the present invention.

What is claimed is:

1. Apparatus for use with a microscope, said apparatus comprising:
   a setting stage adapted for connection to said microscope;
   a translating stage mounted on said setting stage for horizontal movement in a linear direction;
   a rotating stage carried on said translating stage for rotational movement about a vertical axis;
   first and second sample holders mounted on said rotating stage for rotational movement about vertical axes located at their centers;
   drive means linked to said first sample holder for rotating said first sample holder in a first direction; and
   further drive means linking said first and second sample holders for rotating said second sample holder in a second direction which is opposite said first direction when said first sample holder is rotated in said first direction by said drive means.

2. The apparatus of claim 1, further comprising:
   a base plate attached to said setting stage;
   a rotating stage enclosure mounted on said translating stage; and
   said rotating stage being mounted in said rotating stage enclosure for rotational movement about a vertical axis.

3. The apparatus of claim 2, wherein:
   the vertical axes of rotation of the rotating sample holders are coplanar with and equidistant from the vertical axis of rotation of the rotating stage; and
   the vertical axes of rotation of the rotating sample holders and the axis of rotation of the rotating stage are contained in a first vertical plane oriented generally parallel to the direction of movement of the translating stage.

4. The apparatus of claim 3, further comprising alignment keys on the rotating sample holders which are mirror images with respect to a second vertical plane that contains the vertical axis of rotation of the rotating stage, said second vertical plane being orthogonal to the first vertical plane.

5. The apparatus of claim 2, wherein:
the translating stage is driven by a first stepper motor;
the rotating stage is driven by a second stepper motor; and
the rotating sample holders are driven by a third stepper motor.

6. The apparatus of claim 5, wherein said first, second and third stepper motors are operated to obtain submicron movements of the translating stage, the rotating stage and the rotating sample holders.

7. The apparatus of claim 6, wherein:
an absolute position of the translating stage is established with a homing switch;
an absolute position of the rotating stage is established using a first optical encoder; and
an absolute position of the rotating sample holders is established using a second optical encoder.

8. The apparatus of claim 4, wherein the setting stage has a manually operated worm gear with coarse and fine adjustments that allows a focal axis of an objective lens to be brought into the first vertical plane.

9. The apparatus of claim 5, wherein the control module comprises:
a microprocessor;
a control board including controllers for controlling the first, second and third stepper motors;
motor drivers for converting signals from the controllers to current pulses that drive said stepper motors;
a power supply for supplying electrical power to said stepper motors; and
a joystick for driving the translating stage and the rotating sample holders.

10. The apparatus of claim 1, further comprising control means for controlling the respective movements of said translating stage, said rotating stage, and said rotating sample holders.

11. The apparatus of claim 1, wherein said drive means comprises a motor.

12. The apparatus of claim 1, wherein said further drive means comprises a gear train.

* * * * *